United States Patent [19]

Le Bell et al.

[11] Patent Number: 5,059,472
[45] Date of Patent: Oct. 22, 1991

[54] MULTI-PLY WOOD PRODUCT

[75] Inventors: Jean Le Bell, Turku; Simo Valjakka, Espoo; Jussi Pirhonen, Veikkola; Fred Sundén, Nagu; Erkki Hautaniemi, Moisio; Pentti Järvelä, Tampere; Björn Sandelin; Rainer Algars, both of Parainen, all of Finland

[73] Assignee: Oy Partek Ab, Parainen, Finland

[21] Appl. No.: 83,793

[22] PCT Filed: Oct. 28, 1986

[86] PCT No.: PCT/FI86/00124

§ 371 Date: Aug. 31, 1987

§ 102(e) Date: Aug. 31, 1987

[87] PCT Pub. No.: WO87/02616

PCT Pub. Date: May 7, 1987

[30] Foreign Application Priority Data

Oct. 29, 1985 [FI] Finland ................................. 854237

[51] Int. Cl.$^5$ .............................................. B32B 19/00
[52] U.S. Cl. ..................................... 428/161; 144/132; 156/94; 428/537.1; 428/543
[58] Field of Search ............... 428/537.1, 543, 326, 428/161; 156/62.2, 94; 264/257, 36; 144/330, 332; 427/140

[56] References Cited

U.S. PATENT DOCUMENTS

| 2,419,614 | 4/1947 | Welch | 428/139 |
|---|---|---|---|
| 2,565,538 | 8/1951 | Welch | 524/14 |
| 2,831,793 | 4/1958 | Elmendorf | 428/326 |
| 3,427,216 | 2/1969 | Quinn | 428/537.1 |
| 3,457,094 | 7/1969 | Elmendorf | 156/94 |
| 4,084,996 | 4/1978 | Wheeler | 428/326 |
| 4,286,753 | 9/1981 | Lee | 428/326 |

FOREIGN PATENT DOCUMENTS 85680  10/1955  Norway .

Primary Examiner—Paul J. Thibodeau
Attorney, Agent, or Firm—Kane, Dalsimer, Sullivan, Kurucz, Levy, Eisele and Richard

[57] ABSTRACT

The invention relates to a multi-ply wood product. The supply of wood suited e.g. for the production of plywood has considerably decreased. Consequently, attempts have been made to compensate the deterioration in the quality of the surface finish and in other wood qualities e.g. by means of various coating methods, with varying success. The most important problem has been the insufficient adhesion between the coating and the wood. For the elimination of these problems, a multi-ply wood product has been developed in which at least one layer is formed by a crude fiber ply blank comprising haphazardly oriented fiber material as well as bonding agents, additives and filler materials. A single hot-pressing step in connection with the production of the multi-ply wood product forms this blank into homogeneous ply (14) which, by virtue of the partial splitting of the fiber structure and the resulting reorientation, which take place during the hot-pressing, fills the irregularities in the surface of an adjacent wood layer (1) and forms a tight synthetic ply of accurate dimensions.

17 Claims, 2 Drawing Sheets

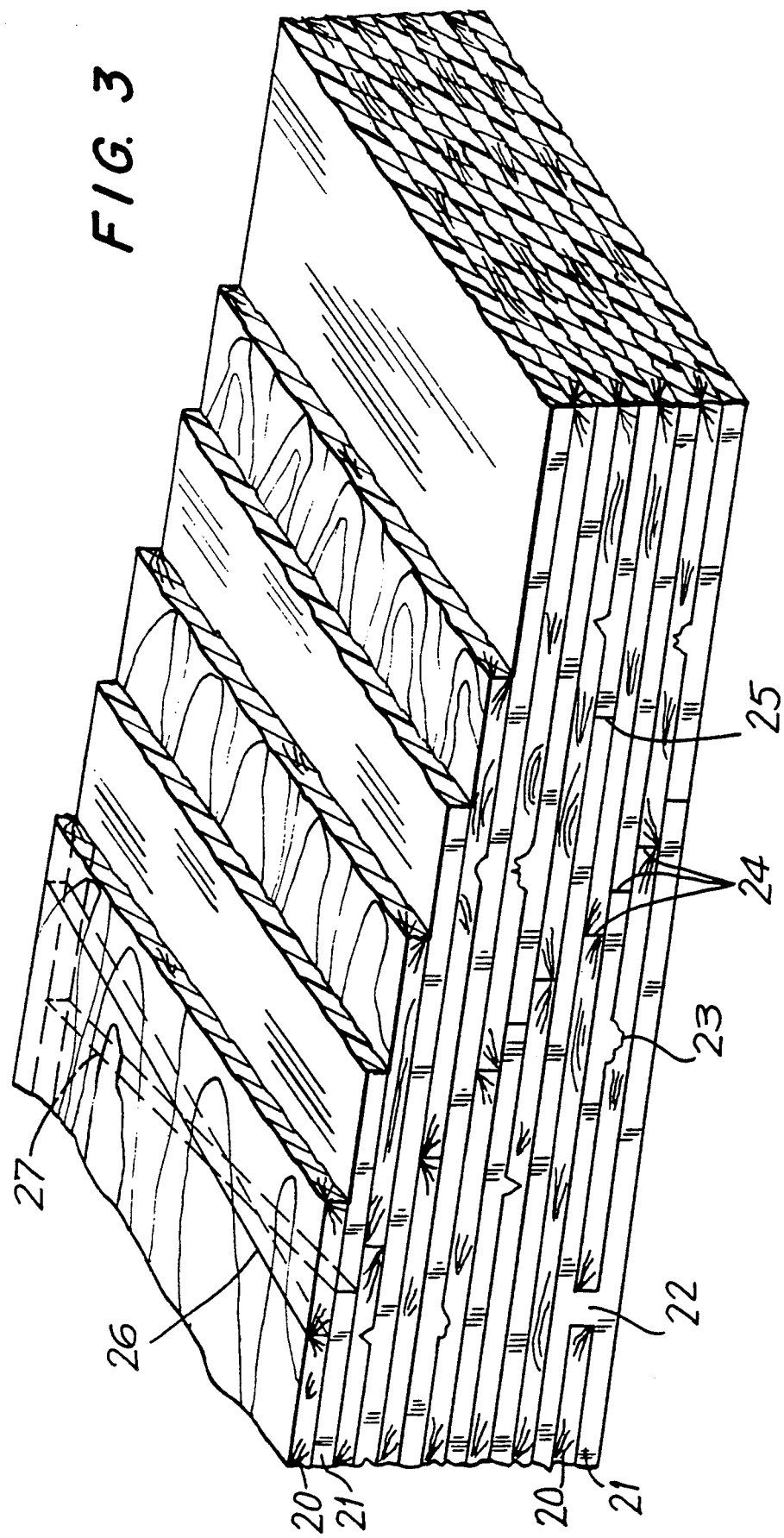

MULTI-PLY WOOD PRODUCT

The present invention relates to a multi-ply wood product. The expression "multi-ply wood product" is here mainly meant to include plywood and laminated veneer lumber.

Plywood industries all over the world have in recent years been compelled to face the fact that it is becoming increasingly difficult to obtain wood of an appropriate quality. The supply of birch wood for wood plies has decreased to such an extent that it is today difficult to maintain the traditionally high quality of plywood; birch wood is very well suited for the production of plies as it is compact and possesses a high wear resistance. Due to the decreased supply it has become necessary to replace birch with other kinds of wood, e.g. softwood, to an increasing degree. Wood plies made of softwood cause problems both for the manufacturer and the user of plywood. Softwood plies have a coarser surface than birch plies. They fracture more easily, and the grossgrained pieces of wood at knot points do not properly stay in place. The traditional production processes of plywood can utilize only about 25 per cent of the obtained raw material. The rest requires new special measures in order to maintain a reasonable quality.

Deterioration in the quality of plywood has caused reactions everywhere in the world. Plywood industries in e.g. Sweden, the Soviet Union and France have made earnest appeals for improvement in this matter. For example, it has been found out that plywood is today more liable to fracture than previously. Neither is it suited for various purposes as well as previously. Plywood causes problems e.g. in the molds of concrete casting. It does not withstand the strains caused by the concrete flow or the vibration of concrete but is broken so that freezing water gets into the cracks, and fractures are formed. Nor does it absorb water and, consequently, water remains between the concrete and the mold, and the formed air bubbles leave marks in the hardened concrete. It has also been found that the impact strength of plywood is lower than previously.

Various efforts have been made to solve the problems. Superficial defects, such as recesses and cracks, affecting the appearance of the plywood, have been evened with a filler. This may be acceptable if the defects are small and not too numerous. As compared with the surrounding wood surface, a defect nevertheless forms an area of discontinued homogeneity which may be the root of problems, depending on the use. The filler does not eliminate the fracture effect caused by the defect; furthermore, the filler often comes off partially or wholly so that moisture gets in between the plies, and a stripping process is started. Defects caused by knots have been repaired by means of a circular piece of homogeneous woodply which is fitted accurately in a hole made round the knot and fastened in the woodply beneath in the single pressing of the plywood sheet. After the pressing, the sheet is ground. With respect to the fracture effect, this way of repairing is better, because the defect is confined within smoothly curving contours. However, the circular piece does not always stay in place. When the plies are apart from each other before the pressing step, the piece is glued in the ply only at the edges thereof. When handling the ply, the piece is often displaced or comes off completely. A further problem arises in that an unnecessarily accurate control is required to provide the circular piece with similar shrinking and swelling properties as the surrounding wood ply. It often happens that the circular piece is curved or cracked due to the greater swelling thereof, or comes off at the edges thereof due to greater shrinking. In general, all the repairs are carried out manually. In view of the manufacturing costs, this is a drawback. The repairs do not notably improve the wear resistance of the plywood, nor is its resistance to weather improved at the repaired points. The appearance, either, is not improved to any greater degree by the local repairings. Thus, it is obvious that this kind of problems are further aggravated as the quality of wood used for plies is deteriorating everywhere.

As to the plywood products in which the preservation of the natural wood pattern of the outer surface of the plywood is of primary importance, the outer surface of the plywood is covered with a transparent membrane which is bonded to the wood surface by means of a resin by hot-pressing. The membrane is a thin film manufactured in advance by pressing, and it is pressed in place in connection with the single pressing of the plywood plate. It covers the defects occuring in the wood surface at least to such an extent that they are not too easily noticeable, including possible local repairings. The wood surface may then be rather coarse and of inferior quality. U.S. Pat. No. 4,084,996 deals with this kind of prior art, and it teaches that a thin cellulose film manufactured in advance is hot-pressed on the outer surface of the plywood by single pressing, with phenol formaldehyde resin as a bonding agent. It can be said that the publication represents the known technique for the manufacture of coated plywood sheets at present on the market, irrespective of whether the membrane is transparent or not. An example of this kind of plywood sheets would be e.g. plywood sheets coated with a so called painting base paper or a so called concreting membrane. Essential is that the fiber structure of the membrane used in the production gets its final shape at an earlier production stage. Consequently, the fibers of the membrane are not any longer able to follow the contours of the defects of the wood surface in the fixing pressing.

It is also known to coat the wood surface in one way or another e.g. with a layer of glass fiber which is bonded by means of a resin, such as a polyester. The coating is usually constructed manually layer by layer. The wood surface may be rather coarse and of inferior quality. The coating adheres properly to the surface of the wood if the surface is clean, and it gives a good protection against any disadvantageous outer effects. Also, it considerably improves the strength of the structure. However, the method is too slow to be applied to mechanical production of plywood sheets, in which the desired final qualities have to be achieved by a single pressing.

A common drawback of known coating methods is that the adhesion between the coating and the surface of the wood is not sufficient for all applications. In such cases as disclosed in the above-mentioned publication, this is due to the unsufficient moldability of the membrane. Although it is elastic and resilient, it does not stretch into every corner of the recesses. Due to the preforming of the membrane, the fibers are so oriented in the direction of the plane of the membrane that they are bent over the sharp corners of the recesses when pressed against the wood surface, so that an empty space remains under the membrane. Besides macroscopic recesses, there are numerous sharp microscopic recesses on the surface of the wood, especially in pine plies. The dense membrane structure does not reach into these recesses. As a result, the thin intermediate layer between the coating and the surface of the wood is not homogeneous. The shearing stresses are thereby in some places transmitted over areas which are not reinforced with fibers. This, of course, affects adversely the strength of the coated plywood sheet as a whole, as compared with a plywood sheet having a homogeneous adhesion layer. A coating which is not pressed on to the surface of the wood is even more greatly affected by this adhesion drawback.

The object of the present invention is to obviate the above drawback s.

Thus, the invention is concerned with a multi-ply wood product which is mainly characterized by what is disclosed in the claim 1. Claim 1 discloses a multi-ply wood product, characterized in that at least one layer thereof is formed by an integral ply formed in connection with the production of the multi-ply wood product by hot-pressing, in a single step, of a crude fiber ply blank comprising haphazardly oriented fiber material, a bonding agent, additives, and filler material, which ply blank, by virtue of the haphazard orientation of its fibers, fills the irregularities of the surface of an adjacent wood layer during the hot-pressing step, and thus forms a compact synthetic ply of accurate dimensions. Preferred embodiments are described in more detail in the claims 2 to 10.

According to the invention, the multi-ply wood product is provided with a synthetic ply which is bonded to a wood ply or wood plies by means of a resin by a single step of hot-pressing in the production of the multi-ply wood product. As distinct from the prior art, the synthetic ply, according to the invention, changes in structure when being pressed in to final position. The synthetic ply initially has a low density and is relatively thick. In this stage, the ply is here called a ply blank. In other words, this ply blank is an elastic fiber composite, light in structure and comprising at least substantially unpressed fiber material, a bonding agent and possibly additives and/or filler materials. The blank is manufactured in advance and is either positioned as such to form the outer surface of the multi-ply wood product, or is positioned between wood plies before the pressing of the product. At the pressing stage of the multi-ply wood product, the ply blank is pressed into a synthetic ply in a single hot-pressing step so that it in the finished wood product forms a structural part the thickness and function of which is similar to those of the wood plies. Since the fibers of the ply blank are haphazardly oriented, they reach into every corner of the recesses. The coating is homogeneous and, consequently, the strength of the entire multi-ply wood product is higher than that of a structure coated with a thin preformed fiber film. Due to the homogeneity, the fracture initiates are considerably less numerous in spite of the fact that the number of the wood ply surface defects may be much greater, i.e. the quality of the wood ply may be much lower than in known coating applications. By virtue of the better adhesion, the coating is also superior in that the wood product is less exposed to the effects of weather. The resistance of the surface is increased by the mere thickness of the synthetic ply as it has roughly the same thickness as the wood plies. But even if the synthetic ply would fracture due to mechanical strains, possible water damage is decisively slowed down by virtue of the high homogeneity and adhesion in the area around the fracture point.

The ply blank is treated according to the requirements of intended purposes. Its basic structure comprises a combination of a fiber material, preferably mineral wool (a glass fiber, mineral fiber, slag fiber, or ceramic fiber) and a resin. In special applications, the mineral wool can, if required, be replaced with a cellulose fiber or some other organic fiber or, more generally, with a fiber which can be opened by machining so that fibers adhering to each other form a firm net. The bonding agent is preferably a resin of high fire-resistance. In special applications, the ply blank is treated according to the requirements in each particular case. Such a special requirement may be e.g. an improved fire-resistance, a required hygroscopicity, a required suppression of reverberation, a low natural vibration spectrum, etc. The primary object, however, is to provide an even, integral, continuous synthetic ply which at least maintains the traditionally good qualities of plywood even though the quality of wood plies would deteriorate considerably. This object is achieved by means of a ply blank having the basic structure comprising at least mineral wool and resin.

The aforementioned aspects relating to plywood essentially apply for laminated veneer lumber as well. In principle, laminated veneer lumber differs from plywood in being thicker, i.e. having more plies, up to about 60 to 160 millimeters, and in that the grain direction of the wood plies are at least essentially in parallel, lengthwise. Laminated veneer lumber is used e.g. for girders in building construction. The U.S. Pat. No. 3,908,725 represents the prior art in this field.

The Finnish Patent Specification 842,695 discloses a composite membrane which is composed of broken mineral fibers bonded to each other with a polymerized bonding agent and which is intended e.g. for building plates. This composite membrane and the fibers thereof, however, are hot-pressed in advance, and the fibers are bonded by means of resin. The use of the composite membrane requires two separate hot-pressing steps: one when the membrane is manufactured and the other when it is fixed in place.

In the following the invention will be described in more detail with reference to the attached schematical drawing.

FIG. 3 illustrates a preferred embodiment of laminated veneer lumber.

Figure 1:
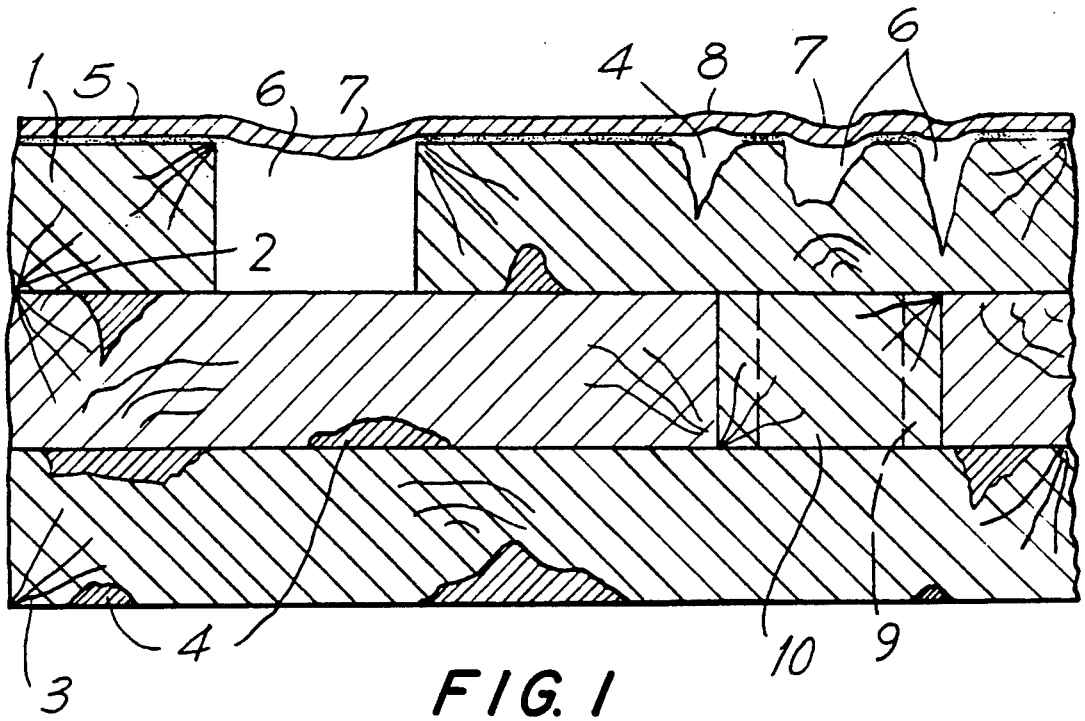
FIG. 1 is an exaggerated cross-sectional view of a plywood sheet according to the prior art.
Figure 2:
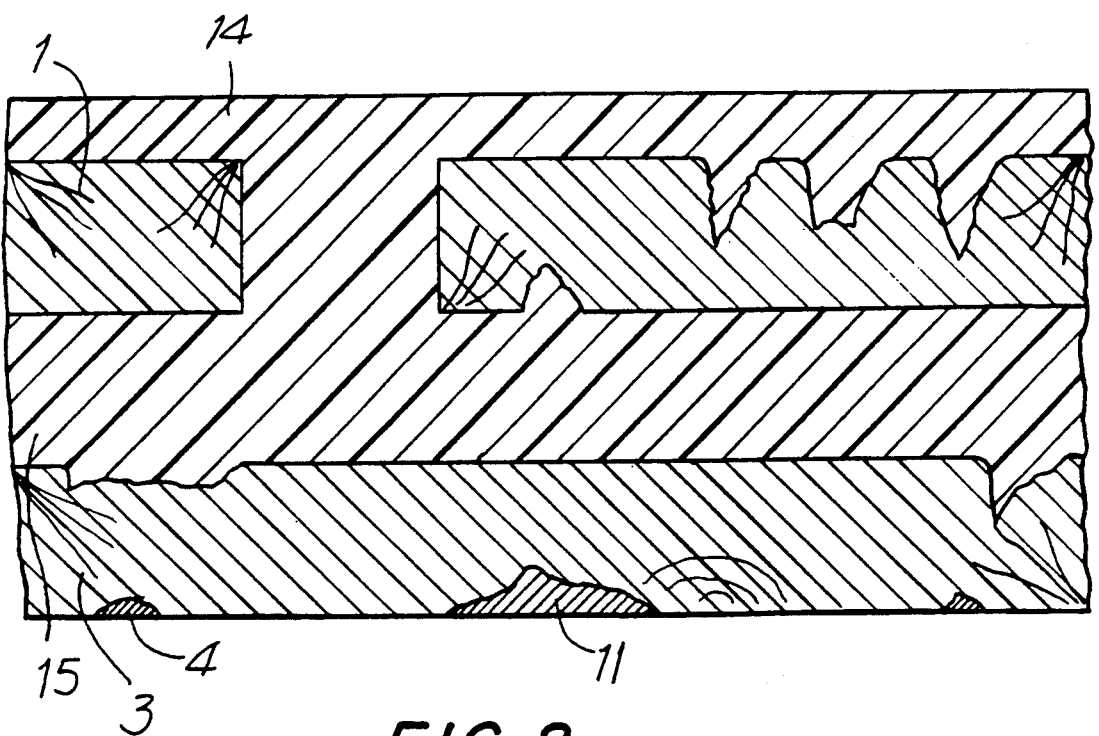
FIG. 2 is a cross-sectional view of a multi-ply wood product (plywood) according to the invention.

In FIG. 1, the reference numerals 1, 2 and 3 designate three wood plies which are glued one upon another so as to form a plywood plate. Defects in the wood plies, such as recesses 4 and 6, are covered with a membrane 5 bonded with a resin. Due to the insufficient resilience of the membrane, it does not follow the contours of the recesses but bends over them, as e.g. at a point 7. The membrane may also swell under the influence of the pressure created by steam or gases generated during the hotpressing, as e.g. at a point 8. Thus, the coating is not homogeneous. The fragile coating may fracture at a cavity, and the recesses may still bring about a further fracture effect. The surface of intermediate plies may be repaired as described above e.g. by means of a circular piece 9 positioned at a knot 10, or by means of a filler 11; however, the result is hardly satisfactory. In the embodiment according to FIG. 2, i.e. that according to the invention, the fibers of coating 14 reach into to the bottom of the recesses. If an unusually high strength is required, one or more wood plies are replaced with a synthetic ply. The synthetic ply 15 of FIG. 2 generally illustrates such a replacement.

In principle, the mineral wool of the synthetic ply is qualitatively similar to the wool obtained immediately after the wool chamber of a conventional mineral wool production line. Thus, it has a low density. The density of the ply blank preferably varies from 50 to 200 kg/m$^3$ If heavy filler material are used, the density may be higher. The ply blank may also contain an original bonding agent, but this is not necessary. If required, the ply blank is pressed lightly into an advantageous initial thickness. However, it is important that the initial length of the fibers, i.e. $\leq 100$ mm, with mineral wool preferably $\leq 10$ mm, remains unchanged as well as the haphazard orientation of the fibers. At the final stage, i.e. when the ply blank is pressed to form a synthetic ply of a multiply wood product, its density is 100 to 5,000 kg/m$^3$, and the length of the fibers $\leq 10$ mm, for mineral wool preferably $\leq 300$ $\mu$m. So called technical wool may well be used, such wool is not especially intended for heat insulation applications. The expression "crude fiber ply blank" here refers to the stage before the hot-pressing step.

A preferred bonding agent for use in ply blanks here contemplated is such, that it is activated at the required pressing temperature, i.e. within the range from 50 to 350° C. The bonding agent is preferably present in the amount from 5 to 70 per cent by weight of the fiber material. If the application requires the use of a bonding agent which requires an unusually great amount of heat to be transmitted through the structure to be pressed, the temperature is maintained at an essentially constant value within said range while the pressing time is made longer. If no special requirements exist, a chlorine-containing polymer, such as, a PVC-type or a generally chlorine containing resin, is used as a bonding agent for improving the fire-resistance. In general, thermoplastic resins are advantageous, because they melt at a moderately raised temperature and are restored to their initial state when they cool. Thermosetting resins lose their bonding properties if the temperature raises too much. However, an advantage thereof is that they resist higher temperatures than thermoplastic resins. Having a greater elasticity, they are more suitable for the transmission of the shearing forces generated in sandwich structures. In addition, they have a higher resistance to tension. A compromise has to be resorted to in the choice of resin; i.e. such a resin is chosen which meets the requirements of the primary function of the synthetic ply in the best possible way.

If a special application requires the choice of an organic fiber or, more generally, a fiber which can be opened by machining, a preferred opening degree is 10 to 30° SR. Such fibers are e.g. cellulose fibers, animal furs, asbestiform fibers, etc.; more generally, fibers which can be made to adhere to each other by machining so that a firm fiber net is formed.

The above-mentioned hygroscopicity and the suppression of reverberation can be adjusted by an advantageous porosity of the synthetic ply. The porosity here means that portion of the volume of the synthetic ply which does not contain solid substances. Preferably, the porosity desired lies in the range from 0 to 80 percent per volume. The desired porosity can be obtained e.g. by the use of a polycondensation resin such as phenol formaldehyde resin as a bonding agent. The natural vibration spectrum of the multi-ply product can be shifted to lower frequencies by adding an advantageous amount of a heavy filler material, such as a mineral powder or components based on barium, tungsten and/or lead, to the ply blank.

An improved fire-resistance is achieved by adding to the ply blank e.g. antimony trioxide or dihydrate gypsym.

The above shows only limitedly how a ply blank provides a multi-ply wood product with desired properties. All possibilities cannot, of course, be described in this connection. A primary object is to make plywood sheets made of wood plies of low quality such, that they meet the expected requirements. This is achieved according to the invention in such a manner that an advantageous number of the wood plies of the multi-ply wood product is replaced with synthetic plies comprising a fiber/bonding agent composite as well as additives and filler materials possibly added thereto. The synthetic ply is positioned, in its initial form, as a ready blank, between the wood plies to be pressed into a sheet and obtains its final form as a synthetic ply of the multi-ply product in the single hot-pressing step for forming the multi-ply wood product. It is thereby self-evident that the invention also relates to all those numerous special properties which are required from a plywood product and which can be achieved by means of the preferred composition of the ply blank.

In the following a few examples are set forth to illustrate the possibilities offered by the method according to the invention. The strength of the sheets is used as a criterion in the comparison, because this is the most important criterion of the usability of plywood.

EXAMPLE 1

A strength test was carried out in which the strength values of geometrically identical wood plies and pieces of synthetic plies manufactured according to the invention and by means of conventional pressing pressures were compared separately under identical conditions and under identical stress.

The fiber material of the synthetic ply was glass fiber having the density of 1,500 kg/m$^3$, and a phenol formaldehyde resin having a concentration of 30 per cent by weight was used as a bonding agent. The porosity of the synthetic ply was 25 per cent per volume. The following results were obtained:

| Ultimate stress | Wood ply | | | Synthetic |
| N/mm$^2$ | Birch | Pine | Spruce | ply |
| --- | --- | --- | --- | --- |
| Tension | 11,5 | 10,6 | 11,0 | 70 |
| Pressure | 5,9 | 6,4 | 3,5 | 160 |
| Bending | 13,6 | 11,8 | 8,3 | 160 |

EXAMPLE 2

Three birch plies having the thickness of 1.3 mm were treated according to the conventional plywood production practices, and were positioned one upon another into a hot press. A synthetic ply blank manufactured according to the invention and having the thickness of about 15 mm and the density of 100 kg/m$^3$ was positioned on the uppermost wood ply and under the lowest wood ply. The ply blank comprised mineral wool and phenol formaldehyde resin having the concentration of 35 per cent by weight calculated on the weight of the blank. The whole package was pressed during 4 minutes at a temperature of 130° C. and a pressure of 1.6 MPa.

After the pressing the thickness of the synthetic plies was 1 mm, the density 1,400 kg/m$^3$, and the porosity 25 per cent per volume, and the thickness of the entire coated plywood plate was 6 mm.

For the strength comparison, another similar sheet was made of the same plies, the outer surfaces of which sheet were coated only with a thin layer of resin; and still another, conventional plywood plate, i.e. a plate the outer surface of which were not treated. The plies were chosen accurately so that the patterns of the defects in the plies of the test plates were as identical as possible both with respect to the position and the geometry thereof. All three test plates were subjected to identical bending tests, using a number of strips cut off the plates in an identical manner. The following results were obtained:

| Test sheet | Bending stress N/mm$^2$ |
| --- | --- |
| Plywood plate + synthetic surface ply | 36.3 to 48.7 |
| Plywood plate + mere resin | 10.8 to 11.2 |
| Mere plywood plate | 9.2 to 9.8 |

As appears from the foregoing, the most essential part of the multi-ply product according to the invention is the synthetic ply and its initial form, a ply blank. It mainly comprises mineral wool which can be glass wool, mineral wool or slag wool, and the multi-ply product is preferably formed by means of a single pressing.

The single pressing has four distinct advantages. Firstly, the single pressing, of course, reduces costs because there is no other pressing. Secondly, the single pressing is advantageous in that bonds of a thermosetting type contained in the wood structure are strained only once. Thirdly, the pressure exerted on the wood structure in the production of plywood may approach the break limit of the wood grains. Particularly in the conventional method of two pressings, the wood material is weakened. The method according to the invention substantially reduces this disadvantage. Fourthly, an adhesive layer of phenol formaldehyde resin between the wood plies is not at all strained when it is in the polymerized state, because it is formed during the single pressing.

The properties of a mineral wool coating is superior to that of other fibers; no delamination deteriorating the properties occurs under the coating. The coating prevents substances possibly emanating from the wood plies from forming bubbles and breaches on the surface. Traditionally, phenol formaldehyde resins are known for being capable of adhering both on wood and mineral fibers, which property can be fully utilized.

By the use of a suitable pressing technique, a plate of accurate dimensions can be provided by means of the mineral wool coating, which is not possible by means of the prior technique for the manufacture of plywood because of the nonexistent deformability of the layers to be laminated.

The properties of mineral fiber plies are superior to those of wood plies; in other words, the ply blank strengthens the wood ply structure so that the traditional strength properties can be obtained with a wood material of lower quality. As the mineral ply blank is able to follow the irregularities of the underlying surface and nevertheless form a homogeneous coating, it is possible to use a ply material of a lower quality than previously, and at the same time avoid the manual repairing of plies, the surface plies in particular. The ply material according to the invention has always a higher strength than a knotty and/or repaired wood ply.

The properties of the synthetic ply blank can be varied to a great extent by changing the components of the ply blank and the proportions of the components. This can be effected similarly as e.g. in the case of plastic composites reinforced with broken fibers and alloyed plastic composites.

In the following a few special advantages are described which can be obtained by means of the synthetic ply blank with a suitable combinations of the raw materials and which substantially widen the use of plates coated with the coating according to the invention. The basic structure of the synthetic ply is mainly formed of mineral wool, which has the above-described splitting and reorienting properties during the pressing of the final laminate layer.

The structure and the covering properties of the laminate layer can be affected by varying the different pressing parameters during the pressing (pressing velocity, cycling).

The special properties of the laminate layer (sound, heat) can be affected substantially by varying the porosity of the surface. A porous laminate layer can be obtained by a suitable polycondensation resin or by means of different kinds of propellants, or by using insufficient amounts of the bonding agent. Phenol formaldehyde resin is a suitable polycondensation resin.

The coatability of the laminate layer can be affected e.g. by the porosity, because a porous surface is easier to coat than a completely tight surface.

The fire resistance of the laminate layer, which layer by virtue of the large amount of organic material contained therein reduces the fireload of the wood plate, can be affected by
reducing the amount of the bonding agent,
using less flammable bonding agents,
using fire prevention chemicals,
using inorganic bonding agents,
adding inorganic filler materials to the bonding agent,
adding water and foam forming additives to the bonding agent.

Examples of heat binding substances are hydrous salts or compounds containing chemically bound water, such as aluminum hydroxide.

The electric, magnetic and thermal properties of the laminate can be modified by means of metal and coal fibers.

The use of traditional textile fiber based coatings becomes even more advantageous because the adhesion to the surface according to the invention is extremely good.

The coating can be coloured throughout.

A plate coated according to the invention has stable dimensions and is homogeneous in all directions.

The manufacture of different kinds of profile pieces of the coating according to the invention is fully possible as well as the profiling of the coating e.g. for improving the friction.

By means of the coating according to the invention a surface considerably harder and more wear-resistant than previously can be obtained.

The coating is completely inert with respect to moisture.

In principle, the multi-ply wood product according to the invention competes with all kinds of coated plywood products which are used today. If the preservation of the wood surface is required, it would be advisable to coat a synthetic ply blank with a wood ply. The price of a multi-ply wood product coated with the synthetic ply according to the invention is competitive as compared with prior plywoods, and besides the traditional applications the product may even find new applications.

This material coated with synthetic ply has at least the following practical applications:

motor and transport industries
surface plates of building industries
casting mold materials
boat building and ship building (intermediate walls)
prefabrication industries
farm building
packing materials.

FIG. 3 illustrates an embodiment of the invention, when applied to laminated veneer lumber. Reference numeral 20 designates wood plies, 21 designates synthetic plies according to the invention, 22 indicates an opening which according to prior art would require a separate filling piece, 23 indicates a notch in the wood ply, 24 and 25 indicate joints which are displaced lengthwise in order to improve the bend strength of the laminated veneer lumber. The joints of the wood plies 20 and the synthetic plies 21 may be bevelled, as indicated by reference numerals 26 and 27.

We claim:

1. A hot-pressed multi-ply wood product, having at least one wooden ply, comprising at least one layer formed by a prefabricated crude fiber ply blank including fiber haphazardly oriented in three dimensions, a bonding agent, additives, and filler material, said ply blank, by virtue of partial breakdown and reorientation of said fiber, fills irregularities of the surface of an adjacent wood ply during hot-pressing, said hotpressing being carried out in a single step, so that said layer becomes fully bonded to said adjacent ply, wherein said fiber is mineral wool.

2. A multi-ply wood product according to claim 1, wherein the initial density of the crude fiber ply blank is 50 to 2,500 kg/m$^3$, and the final density 100 to 5,000 kg/m$^3$, and the initial length of the fibers is $\leq 100$ mm, and the final length about $\leq 10$ mm, the diameter of the fibers being 0.5 to 50 um.

3. A multi-ply wood product according to claim 1, wherein the fiber material comprises fibers machinable at least to an opening degree of 10 to 30° SR.

4. A multi-ply wood product according to claim 1, wherein the amount of the bonding agent is 5 to 70 percent by weight of the fiber material, and that the bonding agent is activated at a temperature of 50 to 350° C.

5. A multi-ply wood product according to claim 1, wherein said prefabricated crude fiber ply blank is fitted between a pair of wood plies, so that after hot-pressing an intermediate layer of said multi-ply wood product is formed.

6. A multi-ply wood product according to claim 1, intended particularly for applications requiring hygroscopicity or suppression of acoustic reverberation, wherein the porosity of said layer is 0 to 80 percent per volume.

7. A multi-ply wood product according to claim 1, intended particularly for applications requiring fire-resistance, wherein a chlorine-containing polymer is used as a bonding agent.

8. A multi-ply wood product according to claim 1, wherein only one layer thereof is a layer made of wood.

9. A multi-ply wood product according to claim 1, in the form of laminated veneer lumber, wherein every second ply is a compact synthetic ply and every other ply is a wood ply.

10. A multi-ply wood product according to claim 1, wherein said mineral wool is selected from a group consisting of glass fiber, mineral fiber, and slag fiber.

11. A multi-ply wood product according to claim 1, wherein the initial density of the crude fiber ply blank is 50 to 2,500 kg/m$^3$, and the final density 100 to 5,000 kg/m$^3$, and the initial length of the mineral wool fibers is $\leq 10$ mm, and the final length of the mineral wool fibers is $\leq 1,000$ $\mu$m, the diameter of the fibers being 0.5 to 50 $\mu$m.

12. A multi-ply wood product according to claim 6 wherein said porosity is obtained by the use of a polycondensation resin as a bonding agent.

13. A multi-ply wood product according to claim 6 wherein said porosity is obtained by the use of a thermoplastic material as a bonding agent.

14. A multi-ply wood product according to claim 7 wherein foamers are used as an additive.

15. A multi-ply wood product according to claim 7 wherein heat binding substances are used as an additive.

16. A multi-ply wood product according to claim 1, wherein said prefabricated crude fiber ply blank is fitted upon a wooden ply, so that, after hot-pressing, a surface layer of said multi-ply wood product is formed.

17. A hot-pressed multi-ply wood product, having at least one wooden ply, comprising at least one layer formed by a prefabricated crude fiber ply blank including fiber haphazardly oriented in three dimensions, a bonding agent, additives, and filler material, said ply blank, by virtue of partial breakdown and reorientation of said fiber, fills irregularities of the surface of an adjacent wood ply during hot-pressing, said hotpressing being carried out in a single step, so that said layer becomes fully bonded to said adjacent ply, wherein said fiber is ceramic fiber.

* * * * *